United States Patent
Langel et al.

(10) Patent No.: US 12,474,483 B2
(45) Date of Patent: Nov. 18, 2025

(54) WIENER-BASED METHOD FOR SPOOFING DETECTION

(71) Applicant: The MITRE Corporation, McLean, VA (US)

(72) Inventors: Steven Edward Langel, Bedford, MA (US); John David Quartararo, Tynsgboro, MA (US); Joseph Samuel Cisneros, Pomona, CA (US); Kevin Francis Greco, Hermosa Beach, CA (US)

(73) Assignee: The MITRE Corporation, McLean, VA (US)

( * ) Notice: Subject to any disclaimer, the term of this patent is extended or adjusted under 35 U.S.C. 154(b) by 0 days.

(21) Appl. No.: 18/298,917

(22) Filed: Apr. 11, 2023

(65) Prior Publication Data
US 2023/0296790 A1 Sep. 21, 2023

Related U.S. Application Data

(63) Continuation of application No. 17/192,445, filed on Mar. 4, 2021, now Pat. No. 11,624,842.

(51) Int. Cl.
| | |
|---|---|
| *G01S 19/37* | (2010.01) |
| *G01S 19/11* | (2010.01) |
| *G01S 19/21* | (2010.01) |
| *G01S 19/23* | (2010.01) |
| *G01S 19/24* | (2010.01) |

(52) U.S. Cl.
CPC ............ *G01S 19/37* (2013.01); *G01S 19/11* (2013.01); *G01S 19/215* (2013.01); *G01S 19/23* (2013.01); *G01S 19/243* (2013.01)

(58) Field of Classification Search
None
See application file for complete search history.

(56) References Cited

U.S. PATENT DOCUMENTS

| | | |
|---|---|---|
| 5,557,284 A | 9/1996 | Hartman |
| 5,583,774 A * | 12/1996 | Diesel ............... G01S 19/49 701/536 |
| 8,934,859 B2 | 1/2015 | Dickman et al. |

(Continued)

FOREIGN PATENT DOCUMENTS

EP 3627190 A1 3/2020

OTHER PUBLICATIONS

T. Zhang, J. Gao and F. Ye, "Anti-spoofing algorithm based on adaptive Kalman filter for high dynamic positioning," 2017 Progress in Electromagnetics Research Symposium—Fall (Piers—Fall), Singapore, 2017, pp. 838-845, doi: 10.1109/PIERS-FALL.2017. 8293251. (Year: 2017).*

(Continued)

*Primary Examiner* — Bernarr E Gregory
(74) *Attorney, Agent, or Firm* — Sterne, Kessler, Goldstein & Fox P.L.L.C.

(57) ABSTRACT

An apparatus that performs spoof detection of satellite signals based on clock information derived from the satellite signals. The apparatus may include a position, velocity, time (PVT) component that derives the clock information from the satellite signals and provides the clock information to a spoof detection mechanism. In some embodiments, the clock frequency estimate is modeled as a Wiener process.

20 Claims, 5 Drawing Sheets

(56) References Cited

U.S. PATENT DOCUMENTS

| | | | | |
|---|---|---|---|---|
| 11,624,842 | B2* | 4/2023 | Langel | G01S 19/23 342/352 |
| 2005/0114023 | A1 | 5/2005 | Williamson et al. | |
| 2006/0074558 | A1 | 4/2006 | Williamson et al. | |
| 2009/0322598 | A1* | 12/2009 | Fly | G01S 19/23 342/357.48 |
| 2014/0327573 | A1* | 11/2014 | Leibner | G01S 19/215 342/357.59 |
| 2016/0377726 | A1 | 12/2016 | Schipper et al. | |
| 2017/0070971 | A1 | 3/2017 | Wietfeldt et al. | |
| 2017/0234986 | A1* | 8/2017 | Ekström | G01S 19/215 342/357.59 |
| 2018/0372878 | A1* | 12/2018 | Syrjarinne | G01S 19/215 |
| 2019/0187294 | A1 | 6/2019 | Khalajmehrabadi et al. | |
| 2019/0243002 | A1* | 8/2019 | Song | G01S 19/215 |
| 2019/0302272 | A1* | 10/2019 | Balog | G01S 19/215 |
| 2022/0021702 | A1* | 1/2022 | Bouthemy | G01S 19/215 |
| 2022/0057526 | A1 | 2/2022 | Keyzer et al. | |

OTHER PUBLICATIONS

M. Ceccato, F. Formaggio and S. Tomasin, "Spatial GNSS Spoofing Against Drone Swarms With Multiple Antennas and Wiener Filter," in IEEE Transactions on Signal Processing, vol. 68, pp. 5782-5794, 2020, doi: 10.1109/TSP.2020.3028752. (Year: 2020).

W. L. Myrick, M. Picciolo, J. S. Goldstein and V. Joyner, "Multi-stage anti-spoofGPS interference correlator (MAGIC)," Milcom 2015—2015 IEEE Military Communications Conference, 2015, pp. 1497-1502, doi: 10.1109/MILCOM.2015.7357656. (Year: 2015).

"Wiener Process (Brownian Motion)"; no author given; undated; 18 pages; on the site ntu.edu.tw.; National Taiwan University; Taipei, Taiwan, Republic of China.; retrieved on Dec. 1, 2022. (Year: 2022).

Kerns, A.J., "Unmanned Aircraft Capture and Control via GPS Spoofing," *Journal of Field Robotics* 31(4), (2014); 29 pages.

Leonardi, M., "ADS-B Anomalies and Intrusions Detection by Sensor Clocks Tracking," *IEEE Transactions on Aerospace and Electronic Systems* 55(5), (Oct. 2019); 12 pages.

Shereen, E., and Dan, G., "Correlation-based Detection of PMU Time Synchronization Attacks," *IEEE International Conference on Communications, Control, and Computing Technologies for Smart Grids*, (2018); 6 Pages.

Zucca, C., et al., "Detecting Atomic Clock Frequency Trends Using an Optimal Stopping Method," *Metrologia 53*: S89-S95, (May 2016); 8 pages.

* cited by examiner

WIENER-BASED METHOD FOR SPOOFING DETECTION

REFERENCE TO RELATED APPLICATIONS

This application is a continuation of co-pending U.S. patent application Ser. No. 17/192,445 entitled "WIENER-BASED METHOD FOR SPOOFING DETECTION," filed Mar. 4, 2021, which is hereby incorporated herein by reference in its entirety now U.S. Pat. No. 11,624,842.

GOVERNMENT RIGHTS

The U.S. government has a paid-up license in this invention and the right in limited circumstances to require the patent owner to license others on reasonable terms as provided for by the terms of Contract Number FA8702-20-C-000 awarded by the Air Force Space and Missile Systems Center Production Corps, User Products Division.

BACKGROUND

Field

The present disclosure generally relates to adapting a process for detecting anomalous deviations in Wiener stochastic processes to the problem of spoofing detection in global navigation satellite systems (GNSS) equipment.

BACKGROUND

GNSS equipment rely on estimation algorithms to estimate its position, velocity, and time (PVT). Measurement fault detection is an important element when designing an estimation algorithm. The importance of fault detection increases for navigation systems which rely on estimates of PVT to make critical decisions that could affect safety of life or the effectiveness of a mission. For these applications, detection and subsequent exclusion of faulty measurements is necessary to ensure that PVT information maintains a high level of integrity and that such equipment is particularly resistant to faults. There are many approaches to estimation, including least-squares, Kalman filtering, and Bayesian estimation, each with different strengths and weaknesses that can be exploited in the design of a fault detection algorithm.

SUMMARY

The present disclosure describes a novel approach to fault detection in estimation algorithms, especially Kalman filtering which maintains a model for expected behavior of measurements. The approach relies on the concept of Wiener process disorder detection.

The Wiener process is a continuous-time stochastic process with discretized results in observed values at discrete points in time where the observed values at each point represent a random variable, i.e., a discrete random walk. In this application, the Wiener process may be used to mathematically represent continuous sample paths of physical phenomena such as diffusion of particles in the air (e.g., pollen, smoke), oscillator frequency drift, and inertial measurement unit (IMU) gyroscopic drift.

Fault detection in GNSS equipment is important for detecting spoofing signals. Spoofing signals, in general, that have not been perfectly compensated for the transmitter-to-receiver transmission channel Such signals will likely can have common-mode errors across all signals broadcast by a single transmitter (i.e., a spoofer). Common-mode range and range rate errors can affect the clock bias and frequency estimates that a victim GNSS receiver must solve in order to estimate it position, velocity, and time (PVT).

The present disclosure involves adapting a Wiener process disorder detector for GNSS equipment in order to detect spoofer-induced deviations of clock estimates from the normally-expected stochastic behavior of clock frequency. This adaptation can be formulated in the context of GNSS Kalman filter (KF) clock estimates. Received GNSS signals may be used to derive GNSS measurements which include an observed behavior of one or more GNSS signals. Additional information is derived from the GNSS measurements such as an estimate of the frequency of the receiver's oscillator, i.e., clock. If the observed behavior deviates from the expected behavior, then that deviation may be indication of spoofed measurements in the GNSS signal. The observed behavior of the clock frequency estimate needs to be transformed into a Wiener process so that it may be compared with the expected behavior which is modeled as a Wiener process. Clock frequency drift may be classically modelled as the output of a system.

In some embodiments, a GNSS receiver includes a modified PVT component that implements this adapted spoof detection. In some embodiments, the modified PVT component derives clock information from GNSS measurements and data that are associated with one or more received GNSS signals. The derived clock information may include a clock frequency estimate and a standard deviation of clock frequency estimate error. The modified PVT component may further calculate an observed behavior associated with the GNSS signal based on the derived clock frequency estimate and the standard deviation of clock frequency estimate error. The observed behavior may be compared to an expected behavior of the GNSS signal and the GNSS signal identified as a spoofed signal based on that comparison.

Further features and exemplary aspects of the embodiments, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate the embodiments and, together with the description, further serve to explain the principles of the embodiments and to enable a person skilled in the relevant art(s) to make and use the embodiments.

Figure 1:
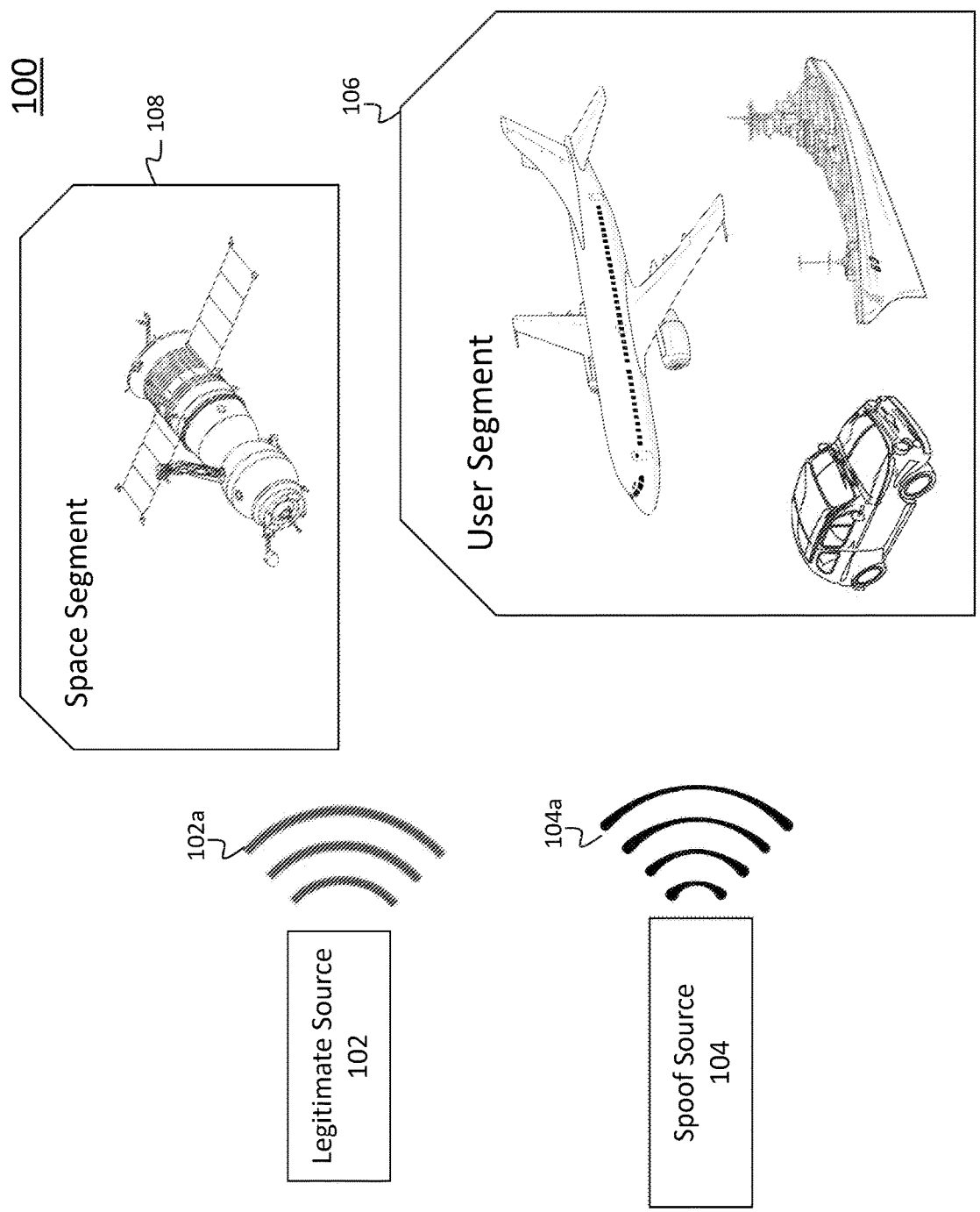
FIG. 1 illustrates an overview of an example implementation, according to some embodiments.

The features and exemplary aspects of the embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. Additionally, generally, the left-most digit(s) of a reference number identifies the drawing in which the reference number first appears. Unless otherwise indicated, the drawings provided throughout the disclosure should not be interpreted as to-scale drawings.

DETAILED DESCRIPTION

The embodiment(s) described, and references in the specification to "one embodiment," "some embodiments," "an example embodiment," "some embodiments," etc., indicate that the embodiment(s) described may include a particular feature, structure, and/or characteristic, but every embodiment may not necessarily include the particular feature, structure, and/or characteristic. Moreover, such phrases are not necessarily referring to the same embodiment. Further, when a particular feature, structure, and/or characteristic is described in connection with some embodiments, it is understood that it is within the knowledge of one skilled in the art(s) to effect such feature, structure, and/or characteristic in connection with other embodiments whether or not explicitly described. The scope of this disclosure is not limited to the disclosed embodiment(s), but is instead defined by the claims appended hereto.

The term "about" or "substantially" or "approximately" as used herein indicates the value of a given quantity that can vary based on a particular technology. Based on the particular technology, the term "about" or "substantially" or "approximately" can indicate a value of a given quantity that varies within, for example, 1-15% of the value (e.g., ±1%, ±2%, ±5%, ±10%, or ±15% of the value).

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM), random access memory (RAM), magnetic disk storage media, optical storage media, flash memory devices, and/or electrical, optical, acoustic, or other forms of propagated signals (e.g., carrier waves, infrared signals, digital signals, etc.), and others. Further, firmware, software, routines, and/or instructions may be described herein as performing certain actions. However, it should be appreciated that such descriptions are merely for convenience and that such actions in fact result from computing devices, processors, controllers, and/or other devices executing the firmware, software, routines, instructions, etc.

FIG. 1 is a diagram of an overview of a system 100 in which features described in this disclosure may be implemented. As described herein, system 100 merely provides a general discussion of features for performing spoof detection. More details of the process and the interactive visualization are discussed with respect to FIGS. 2-3 below.

As shown in FIG. 1, example system 100 may include a legitimate source 102 that provides legitimate signals 102a, a spoof source 104 that provides spoofed signals 104a, and a user segment 106. Legitimate source 102 may be implemented as part of space segment 108, such as a satellite. An example of space segment 108 are global navigation satellite systems (GNSS) that transmit GNSS signals. User segment 106 may include any number of devices that rely on received signals and derive its position from these received signals. Examples of such devices include planes, boats, cars, and user devices such as cell phones and smart watches. Each of these devices include signal receivers for receiving and processing the signals. Spoofed signals 104a transmitted from spoof source 104 can disrupt the operations of such devices because the information contained within spoofed signals 104a are inaccurate and cause the devices to derive incorrect position information.

An example of the GNSS signal is a Global Positioning System (GPS) signal. GPS is a critical capability for a number of applications in user segment 106 including consumer and military applications. Examples of military applications include handheld units that soldiers use for navigating on foot, as well as receivers mounted on vehicles, ships, aircraft, and guided munitions. Examples of consumer applications which rely heavily on GNSS and GPS for navigation include civilian aircraft, autonomous vehicles, personal navigation, communications equipment timing, and timing for the power grid. All of these applications require robust protection against spoofed signals. Specifically, protecting the integrity of calculations performed by signal receivers is critical to ensuring these applications perform correctly. This is particularly true for navigation systems that rely on estimates of position, velocity, and time PVT to make critical decisions like releasing a weapon or landing an aircraft.

For all these applications, measuring fault detection (or spoofing detection) is an important element in receiving and processing these signals. This disclosure describes a novel method for detecting anomalous deviations in quantities that would be well-described in benign (i.e., non-spoofed) environments by Wiener stochastic processes in the context of spoofing detection in global navigation satellite system (GNSS, e.g., GPS) user equipment. Imperfectly-generated (i.e., imperfectly compensated for the spoofer-to-receiver transmission channel) spoofing signals will likely have common-mode errors across all signals broadcast by a single transmitter. These errors can affect clock bias and frequency estimates that a victim receiver must solve in order to estimate its PVT. Clock bias and frequency processes in typical situations are driven by the receiver's oscillator and its stochastic behavior is generally predictable. The method detects any spoofer-induced deviations of the clock estimates from the nominally expected stochastic behavior. One approach to estimation, utilizes Kalman filtering and, in one embodiment, the method applies to the context of GNSS Kalman filter (KF) clock estimates A global navigation satellite system (GNSS, e.g, GPS) receiver in using the method of the current disclosure could distinguish legitimate signals 102a from legitimate source 102 (e.g., from a GPS satellite in space segment 108) from spoofed signals 104a broadcast by spoof source 104 which could corrupt the receiver's navigation solution (e.g., position, velocity, and/or time estimates). The method of the current disclosure relies on two concepts: the known property that all GNSS receivers require an oscillator to function, and the drift behavior of oscillators is generally well-understood and modeled statistically as a Wiener Process and the likely presence of common-mode errors in the false signals broadcast by a single spoofer. The imperfections in spoofed signals 104a can result in distortions of the clock frequency estimate in the victim receiver and statistically deviate from the expected Wiener Process of the drift behavior. In some embodiments, equipment in user segment 106 may be implemented with an updated GNSS receiver that includes the components for monitoring a sequence of clock frequency estimates to detect so-called "disorder" of the Wiener Process which can indicate the presence/inclusion of spoofed signals in the receiver's navigation processing.

Figure 2:
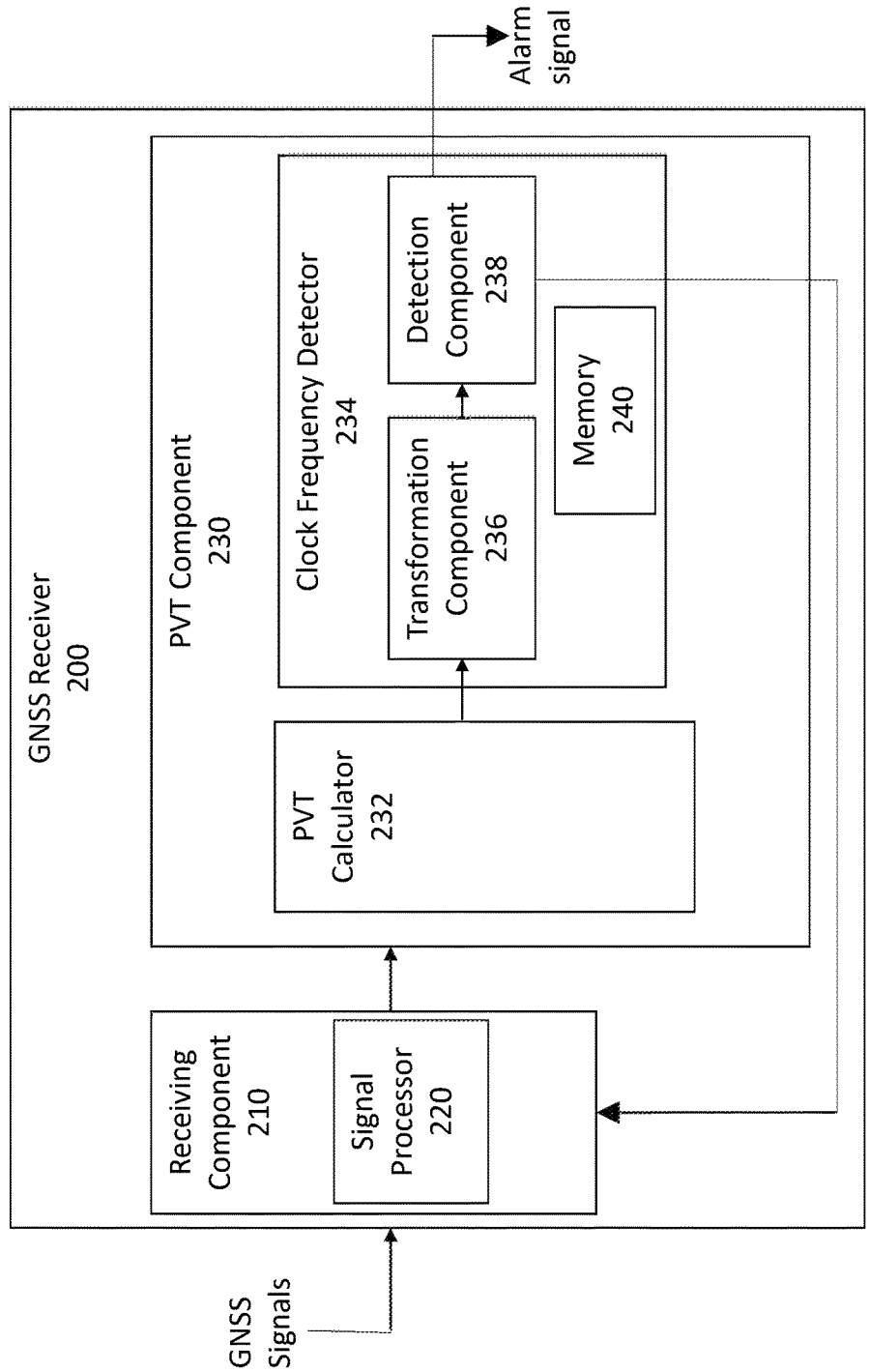
FIG. 2 illustrates an example global navigation satellite system receiver for performing spoof detection, according to some embodiments.

FIG. 2 illustrates a modified GNSS receiver 200 for performing spoof detection based on clock frequency estimates, according to various exemplary embodiments. In some embodiments, GNSS receiver 200 may be implemented with a Kalman filter that is used for performing PVT estimates. Kalman filters particularly benefit from the spoof detection described in this disclosure because they recursively update a state estimate which could become tainted by false information introduced by spoofed signals.

Receiving component 210 receives GNSS signals from an external source. The GNSS signals may be a malicious transmitter (e.g., spoof source 104), or from a legitimate transmitter (e.g., legitimate source 102), or some combination thereof. Receiving component 210 may include signal processor 220. Signal processor 220 may process the GNSS signals by deriving GNSS measurements and other data such as estimates of Doppler shift and delay and data messages that may be embedded in the GNSS signals.

In some embodiments, PVT component 230 receives the GNSS measurements from signal processor 220. PVT component 230 may include a number of components including PVT calculator 232, and clock frequency detector 234.

PVT calculator 232 may process the GNSS measurements to derive observed location and clock information. Examples of clock information derived by PVT calculator 232 include clock bias estimates, clock frequency estimates, and a standard deviation of the clock frequency estimate error. Examples of the location information include position, velocity, and time (PVT). The location and clock information generated by PVT calculator 232 is based on one or more received GNSS signals and therefore may be considered to be an observed behavior of the received GNSS signals.

Due to one or more spoofed signals, there may be disorder in this observed behavior of clock frequency estimates. This disorder may deviate from the expected behavior of the clock frequency. In an embodiment, this expected behavior is modeled from the Wiener process and typically depends on the oscillator (not shown) of GNSS receiver 200.

In order to detect any disorder in the observed clock information, clock frequency detector 234 may process the clock frequency estimates and standard deviation of the clock frequency estimate error information from PVT calculator. In some embodiments, clock frequency detector 234 may be implemented as a Wiener processor disorder detector that detects the disorder in a clock frequency that is expected to be described by a Wiener process.

Clock frequency detector 234 may be implemented with transformation component 236, detection component 238, and memory 240. In some embodiments, transformation component 236 may be configured to process the clock frequency estimates by transforming the estimates into a Wiener process so that it may be compared with the expected behavior which is already modeled as a Wiener process. Transforming the clock frequency estimates may include normalizing the clock frequency estimates using the standard deviation of the clock frequency estimate error information, derived from the underlying Kalman filter measurement and plant model, to generate a sample. The resulting normalized estimate must coincide with the standard Wiener process.

Transformation component 236 may normalize the clock frequency estimate to create a sample for a particular time interval. In some embodiments, transformation component 236 may calculate a sample using the following equation, $\sigma_k^{-1}(\hat{f}_k - \hat{f}_{k-1})$, where σ-represents the standard deviation of the clock frequency estimate error, k represents the current timestamp, $\hat{f}_k$ represents a clock frequency estimate at a current timestamp, and $\hat{f}_{k-1}$ represents a clock frequency estimate at a previous adjacent timestamp. The relationship $\hat{f}_k - \hat{f}_{k-1}$ may therefore represent a clock frequency estimate difference over a current time interval.

Figure 3:
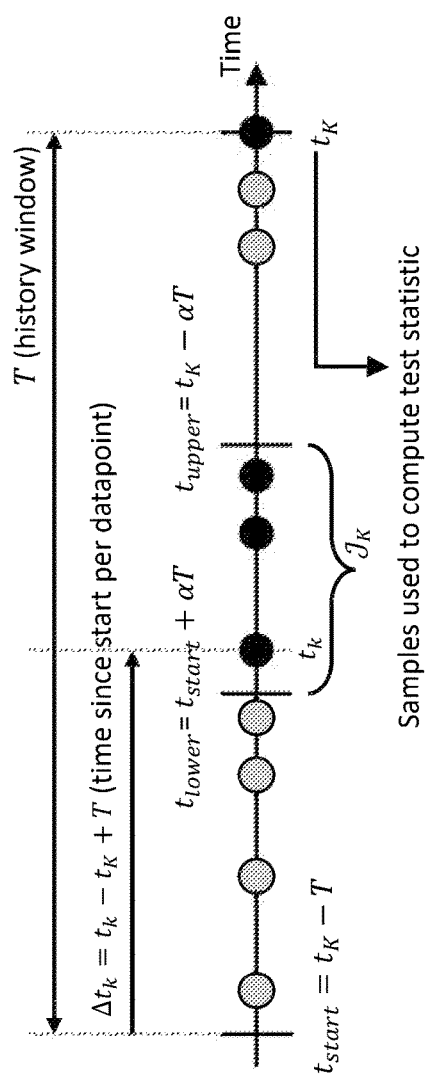
FIG. 3 illustrates an example clock frequency detector for detecting deviations in observed clock frequency behavior from expected clock frequency behavior, according to some embodiments.

Clock frequency detector 234 may store sequences of these samples from different time intervals in a memory. Note that storing samples over the entire history of the process could result in unbounded in memory growth requirements that would be impractical for some real-time implementations and applications. Accordingly, in some embodiments, clock frequency detector 234 employs a finite-length sliding window implementation for storing the most recent history of samples instead of storing all calculated samples. FIG. 3, which is discussed below, depicts an example implementation of the sliding window.

In some embodiments, the sequence of samples may be calculated based on the following equation where (k represents a cumulative sum of previous samples, and $\xi_0$ represents the oldest of trailing history of samples:

$$\xi_k = \xi_{k-1} + \sigma_k^{-1}(\hat{f}_k - \hat{f}_{k-1}), \xi_0 = 0$$

In some embodiments, memory 240 may be implemented as a circular buffer that maintains a history of the process for a defined time window (e.g., a time window of a number of seconds instead of the entire history) and clock frequency detector 234 stores calculated samples in the buffer. Transformation component 236 may provide the sequence of samples to detection component 238 which is configured to detect any disorder in the provided sequence of samples. Detection component 238 may calculate an observed behavior from this sequence of samples.

Referring now to FIG. 3, which depicts an example implementation of a sliding history window 300 for storing calculated samples, detection component 238 may utilize sliding window 300 as part of the process for detecting any disorder within the sequence of samples provided by transformation component 236.

Sliding history window 300 may be configured to represent a history of size T (e.g., in seconds) and $t_K$ is the most recent sample's timestamp ("current" time). A particular time window within the sample history of size T may be defined as $\mathcal{I}_K = [t_K - T + \alpha T, t_K - \alpha T]$, where $\alpha \in (0, 1/2)$, $t_K - T + \alpha T$ is the lower bound of the time window, $t_K - \alpha T$ is the upper bound of the time window, and the elapsed time of a sample relative to the history start $\Delta t_k = t_k - t_K + T$ for an arbitrary $t_k \in \mathcal{I}_K$. The parameter a may not exceed 1/2 because this would result in a time interval $\mathcal{I}_K$ that goes backwards in time which would not lead to an accurate depiction of observed behavior. Practically, a non-zero parameter a is an analytical side effect to ensure that a valid relationship between the probability of false alarm and alarm threshold can be established (discussed further below).

To calculate a sequence of values from the same history, where $t_k \in \mathcal{I}_K$, transformation component 236 may calculate for all measurements in the interval $[t_K - T + \alpha T, t_K - \alpha T]$ the new sequence of values, $z_k$, which represents the observed behavior. An example of this calculation is shown below where $z_k$ is based on the sample history, a sample summation $\xi_K$ at current time K and sample summation $\xi_k$ where k represents the time of each element in the history.

$$z_k = \sqrt{\frac{\Delta t_k (T - \Delta t_k)}{T}} \left( \frac{\xi_k}{\Delta t_k} - \frac{\xi_K - \xi_k}{T - \Delta t_k} \right)$$

The sequence of values $z_k$ represents a collection of numbers that may need to be further processed into a single number, known as the test statistic, that can be compared to a threshold values to determine whether the observed behavior deviates from the expected behavior (i.e., modelled from the Wiener process). FIG. 3 depicts samples in the history including samples within time window $\mathcal{J}_K$ that, along with the sample from the current time $t_K$ are used in calculating the test statistic.

There are many ways to process $z_k$ to generate a single number representing the observed behavior. In some embodiments, the test statistic $q_K$ may be obtained by taking the max value in the sequence of values $z_k$ which may provide the highest probability of detecting anomalous or ramp behavior in the observations:

$$q_K = \max_{t_k \in \mathcal{J}} |z_k|$$

The test statistic $q_K$ may be compared to a threshold value y. If $q_K$ exceeds the threshold value, a meaningful deviation in the drift in the observed behavior is indicated. In some embodiments, the threshold value y may be determined by first obtaining an equation for the probability of false alarm $P_{fa}$ and then using this equation "in reverse" to determine the appropriate threshold for a desired $P_{fa}$. One example of such an equation is represented below where $\alpha \in (0, 1/2)$:

$$P_{fa} = \left(\frac{2}{\pi}\right)^{\frac{1}{2}} \exp(-y^2/2) y \left[ \log\left(\frac{1-\alpha}{\alpha}\right)\left(1 - \frac{1}{y^2}\right) + \frac{2}{y^2} \right]$$

The probability of false alarm $P_{fa}$ may be provided via user input or predefined based on the particular application of the GNSS receiver (e.g., military application, navigation, landing a plane). Different applications may have different false alarm rates. For example, a false alarm in a GNSS receiver in a plane (e.g, for landing a plane) may be very costly and therefore will have a lower false alarm rate. In contrast, a user application such as a GNSS receiver in a cell phone or smart watch may have a high tolerance for alarms which would therefore provide a higher false alarm rate. Once the probability of false alarm $P_{fa}$ is determined, detection component 238 may then solve for the threshold value y.

Equations described above are merely exemplary and are not intended to limit the implementation of clock frequency detector 234. For example, the threshold value y may not be tied to the probability of false alarm $P_{fa}$ discussed above but may be retrieved from a pre-computed lookup table that defines threshold values for different applications. One of ordinary skill in the art would understand that other relationships may be used to calculate the sequence of values and the test statistic based on the samples.

Referring back to FIG. 2, in an embodiment, memory 240 may be implemented to store both a history of the samples (as noted above) as well as the cumulative sums.

When a new sample (e.g., $\sigma_{k+1}^{-1}(\hat{f}_{k+1} - \hat{f}_k)$), is processed, the entire time series $z_k$ must be recomputed (e.g., $z_{k+1}$) because the weights applied to each value depend on the timestamp and value of the newest sample at the current timestamp, $t_K$. Furthermore, each element of $z_k$ depends on $\xi_k$, each of which is a sum of the samples $\sigma_k^{-1}(\hat{f}_k - \hat{f}_{k-1})$ over a slightly different finite-length window, i.e., not a simple infinitely-accumulating sum which could be stored as a single value that is updated recursively. Instead of recomputing the sums entirely from scratch over the stored sample history at each iteration, memory 240 may be implemented as two separate buffers. Clock frequency detector 234 may maintain the most recent history of samples $\sigma_k^{-1}(\hat{f}_k - \hat{f}_{k-1})$ in a first buffer alongside a second buffer that stores cumulative running sums of those samples $\xi_{0:K}$ (e.g., $\xi_1$ is the sum of samples from time indices 0:1, $\xi_2$ the sum of samples from time indices 0:2, etc.). Accordingly, when the new sample is pushed into the sample history buffer, the value of the new sample may be added to each element of the cumulative sums buffer $\xi_{0:K}$. And when an old sample is removed (related to the timestamps and history size) and no longer needed for calculating samples, that value may be subtracted from each element of the cumulative sums buffer $\xi_{0:K}$. This process provides a more efficient implementation for incorporating new samples and removing old samples from the time series and querying the various corresponding cumulative sums.

Memory 240 in which the samples are stored may be implemented as a circular buffer to store histories of the samples and the cumulative sums. To avoid dynamic memory allocation in real-time systems, circular buffers may be used to ensure that memory is allocated only once, and that adding a new data sample requires only minimal computation (i.e., the entire sequence of values doesn't need to be copied or moved around in memory).

Once the probability of false alarm $P_{fa}$ is determined and the threshold value y is derived, detection component 238 may then generate an alarm if the test statistic $q_K$ is greater than the threshold value y (e.g., $q_K$>y). This alarm may be sent to an output to alert a user such as a blinking light in a cockpit of a plane. In some embodiments, detection component 238 may send the alarm signal to receiving component 210 that can take some mitigating actions based on the alarm signal. For example, receiving component 210 may drop a certain signal or set of signals or quarantine the signals as part of a process for gathering data for situational awareness purposes but are not used to derive PVT estimates.

Figure 4:
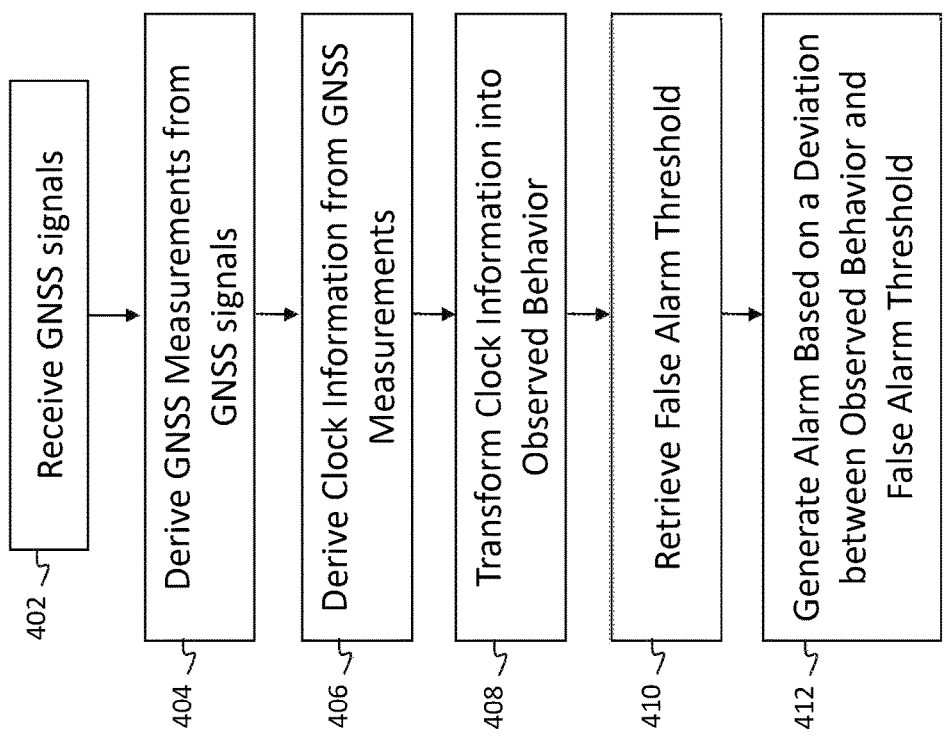
FIG. 4 illustrates a flow diagram for performing spoof detection on one or more global navigation satellite system signals, according to some embodiments.

FIG. 4 illustrates an example method 400 for generating an alarm signal based on the detected deviations in observed clock frequency estimates from expected behavior, according to various exemplary embodiments. As a non-limiting example with regards to FIG. 4, one or more processes described with respect to FIG. 4 may be performed by a GNSS receiver (e.g., GNSS receiver 200 of FIG. 2) to detect deviations in clock frequency of received GNSS signals. In such an embodiment, GNSS receiver 200 may execute code in memory to perform certain steps of method 400. While method 400 will be discussed below as being performed by GNSS receiver 200, other devices may store the code and therefore may execute method 400 by directly executing the code. Accordingly, the following discussion of method 400 refers to FIG. 2 merely as an exemplary non-limiting implementation of method 400. For example, method 400 may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof. Moreover, it is to be appreciated that not all steps may be needed to perform the disclosure provided herein. Further, some of the steps may be performed simultaneously or in a different order than shown in FIG. 4, as will be understood by a person of ordinary skill in the art.

Method 400 is also described with reference to sliding window 300 described with respect to FIG. 3 which is merely exemplary of the sliding windows that may be used for calculating samples within a particular time interval. Other implementations of a sliding window may be utilized and the present disclosure is not limited to the specific sliding window described with respect to FIG. 3. For example, sliding window 300 may be implemented with a different time span for the history window or a different method for calculating the lower and upper bounds of the time interval for the test statistic.

In 402, receiving component 210 receives global navigation satellite system (GNSS) signals.

In 404, signal processor 220 processes the GNSS signals from receiving component 210. Signal processor 220 may derive GNSS measurements from the GNSS signals. Examples of GNSS measurements include common GNSS observables (or observed behavior) such as an estimate of Doppler shift, delay, and data messages within the signals.

In 406, PVT component 230 may further derive clock information from the GNSS measurements. Clock information may include clock bias, clock frequency, and a standard deviation of clock frequency estimate error derived from an error model and the GNSS measurements.

In 408, transformation component 236 may calculate an observed behavior of the GNSS signal. In some embodiments, the observed behavior may be calculated based on the clock frequency and the standard deviation of clock frequency estimate error. The observed behavior may represent the behavior of the drift in the clock frequency. The clock frequency may include a first clock frequency estimate at a first timestamp k, $\hat{f}_k$, and a second clock frequency estimate at a previous adjacent timestamp k−1, $\hat{f}_{k-1}$, and the standard deviation is represented by $\sigma_k$.

In some embodiments, calculating the observed behavior may involve retrieving a plurality of historical samples from memory 240. The plurality of historical samples are samples that were previously generated over a predefined time window. The predefined time window may represent the time span of samples stored in memory 240. For example, as described with respect to FIG. 3, the predefined time window may be a history window with T seconds. The plurality of historical samples may be represented as a previously calculated cumulative sum $\xi_{k-1}$. The current cumulative sum Ga may be calculated by adding the current sample to the previously calculated cumulative sum. The sequence k and the previously calculated sequence $\xi_{k-1}$ may be stored in memory 240 which, in some embodiments, is implemented as a circular buffer. In other words, the predefined time window represents a sliding time period in which the plurality of historical samples is stored in the memory.

Transformation component 236 may provide the cumulative sum $\xi_k$ to detection component 238 that is responsible for performing a calculation on the cumulative sum to identify the test statistic. In some embodiments, the test statistic is a numerical representation of the observed behavior associated with the GNSS signal. In some embodiments, the calculation of the test statistic may further involve calculating a time series based on the updated sequence and generating the test statistic based on the time series. The time series represents the observed behavior associated with the GNSS signal. FIG. 2 described one embodiment where time series is represented by $z_k$ and is a collection of values computed from the samples over a specific time interval $\mathcal{I}_K$.

Detection component 238 may also be responsible for removing stale samples from the memory. Detection component 238 may identify any stored samples in memory 240 that are associated with a time value outside of the time interval as stale samples. Samples become stale as new samples from subsequent time intervals are calculated and stored in memory 240.

In 410, detection component 238 may retrieve the false alarm threshold, such as threshold value y. In some embodiments, the false alarm threshold may be calculated based on a probability of false alarm that sets a tolerance level for false alarms. The probability of false alarm may be provided via one of user input or a predefined value associated with an application that is utilizing the GNSS signal such as a GPS application installed within at least one of an airplane, a vehicle, or a user device.

In 412, detection component 238 may generate an alarm signal based on a deviation between the observed behavior and the false alarm threshold. Detection component 238 may compare the observed behavior with the alarm threshold and generates the alarm based on this comparison such as when the alarm signal is generated when the deviation exceeds the threshold. In some embodiments, the alarm signal may trigger a physical alert such as a blinking alert or audible alarm indicating that the GNSS signal is a spoofed signal.

Figure 5:
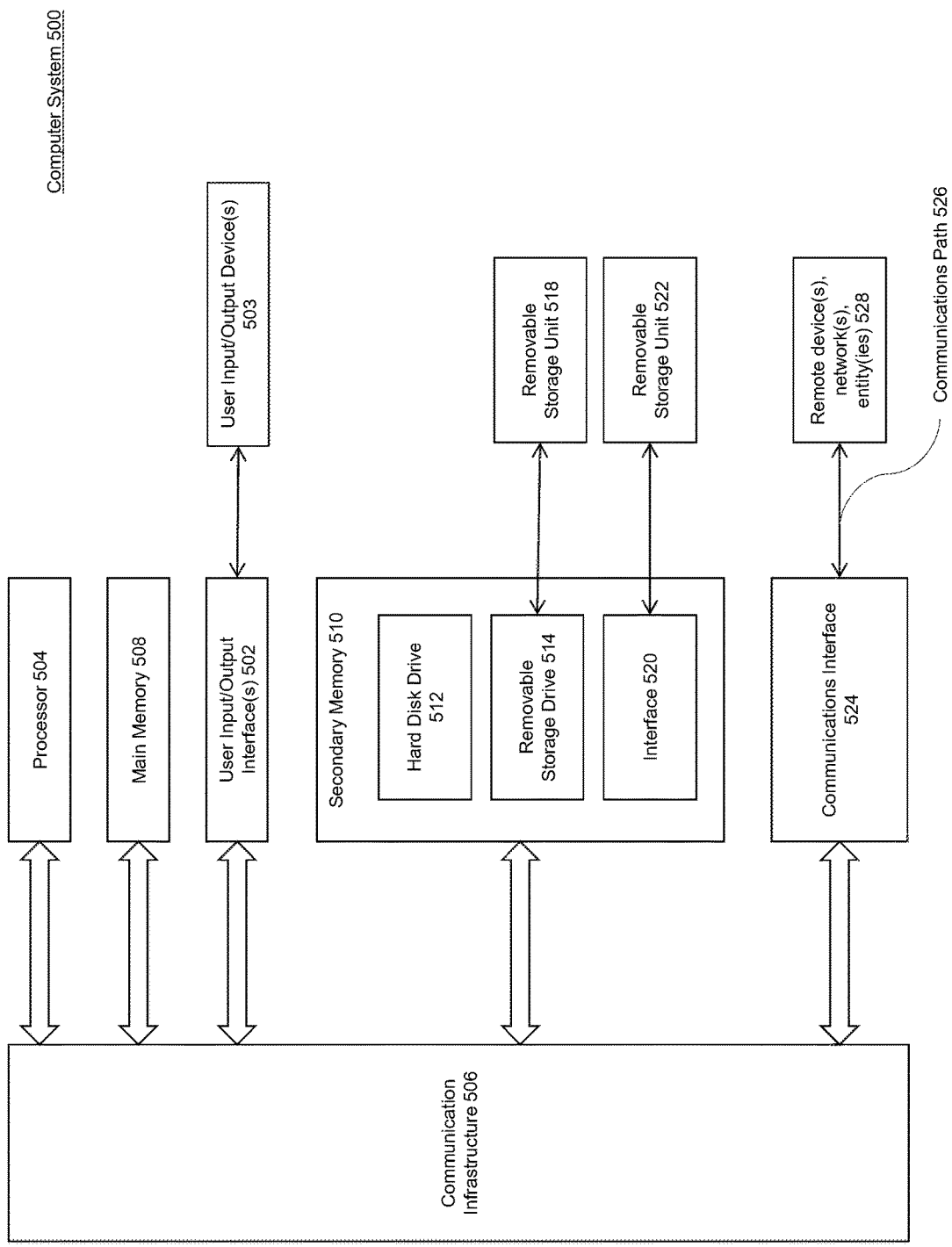
FIG. 5 is an example computer system useful for implementing various embodiments.

Various embodiments can be implemented, for example, using one or more computer systems, such as computer system 500 shown in FIG. 5. Computer system 500 can be used, for example, to implement method 400 of FIG. 4. For example, computer system 500 can determine a resource block allocation of a portion of a tone space using a lookup table. Computer system 500 can further map a plurality of tones to a resource block based on the determined resource block allocation, according to some embodiments. Computer system 500 can be any computer capable of performing the functions described herein.

Computer system 500 can be any well-known computer capable of performing the functions described herein.

Computer system 500 includes one or more processors (also called central processing units, or CPUs), such as a processor 504. Processor 504 is connected to a communication infrastructure or bus 506.

One or more processors 504 may each be a graphics processing unit (GPU). In some embodiments, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In some embodiments, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be understood that the phraseology or terminology herein is for the purpose of description and not of limitation, such that the terminology or phraseology of the present specification is to be interpreted by those skilled in the relevant art(s) in light of the teachings herein.

The above examples are illustrative, but not limiting, of the embodiments of this disclosure. Other suitable modifications and adaptations of the variety of conditions and parameters normally in the field, and which would be apparent to those skilled in the relevant art(s), are within the spirit and scope of the disclosure.

While specific embodiments have been described above, it will be appreciated that the embodiments may be practiced otherwise than as described. The description is not intended to limit the scope of the claims.

It is to be appreciated that the Detailed Description section, and not the Summary and Abstract sections, is intended to be used to interpret the claims. The Summary and Abstract sections may set forth one or more but not all exemplary embodiments as contemplated by the inventor(s), and thus, are not intended to limit the embodiments and the appended claims in any way.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art(s), readily modify and/or adapt for various applications such specific embodiments, without undue experimentation, without departing from the general concept of the embodiments. Therefore, such adaptations and modifications are intended to be within the meaning and range of equivalents of the disclosed embodiments, based on the teaching and guidance presented herein.

The breadth and scope of the embodiments should not be limited by any of the above-described exemplary embodiments, but should be defined only in accordance with the following claims and their equivalents.

What is claimed is:

1. An apparatus for spoofing detection, the apparatus comprising:
    an application installed on the apparatus, wherein the application comprises at least one of a military application or a consumer application, and wherein the apparatus is configured for at least one of military usage or consumer usage;
    a receiving component configured to receive one or more global navigation satellite system (GNSS) signals, wherein the receiving component includes a Kalman filter, wherein the application is configured to utilize the one or more GNSS signals from the receiving component;
    a signal processor configured to derive, from the one or more GNSS signals, one or more GNSS measurements; and
    a position, velocity, and time (PVT) component configured to:
        derive clock information and location information from the one or more GNSS measurements;
        calculate an observed behavior associated with the one or more GNSS signals based on the clock information and the location information; and
        identify the one or more GNSS signals as being spoofed based on a comparison between the observed behavior and an expected behavior of the one or more GNSS measurements.

2. The apparatus of claim 1, wherein the apparatus configured for military usage comprises one of a receiver mounted onto a vehicle, a receiver mounted onto a ship, a receiver mounted onto an aircraft, a handheld device, or a receiver mounted onto a guided munition.

3. The apparatus of claim 1, wherein the apparatus configured for consumer usage comprises one of a civilian aircraft, an autonomous vehicle, and a personal navigation device.

4. The apparatus of claim 1, wherein a type of the application installed on the apparatus is a navigation application.

5. The apparatus of claim 1, wherein the expected behavior of the one or more GNSS measurements is represented by a false alarm threshold, and wherein the false alarm threshold is determined based on a type of the application installed on the apparatus.

6. The apparatus of claim 5, wherein the PVT component is further configured to:
compare the observed behavior with the false alarm threshold; and
generate an alarm signal based on the comparison.

7. The apparatus of claim 6, wherein the alarm signal triggers a physical alert indicating that the one or more GNSS signals are spoofed.

8. The apparatus of claim 6, wherein the PVT component is further configured to:
provide the alarm signal to the receiving component, and wherein the receiving component is further configured to:
perform a mitigation action to prevent using the one or more GNSS signals from further PVT calculations, wherein the mitigation action includes at least one of dropping the one or more GNSS signals and quarantining the one or more GNSS signals.

9. The apparatus of claim 6, wherein the false alarm threshold is calculated based on a probability of a false alarm and wherein the probability is based on a predefined value associated with the type of the application.

10. The apparatus of claim 6, wherein the alarm signal is generated when a test statistic associated with the observed behavior associated with the one or more GNSS signal exceeds the false alarm threshold.

11. The apparatus of claim 1, wherein the observed behavior includes one or more estimates of Doppler shift.

12. The apparatus of claim 1, wherein the clock information includes a clock frequency estimate and a standard deviation of clock frequency estimate error.

13. The apparatus of claim 12, wherein the expected behavior of the one or more GNSS measurements and an expected behavior of the clock frequency estimate are modeled from a Wiener process.

14. The apparatus of claim 12, further comprising:
a memory implemented as a circular buffer.

15. The apparatus of claim 14, wherein to calculate the observed behavior associated with the one or more GNSS signals, the PVT component is further configured to:
retrieve a plurality of historical samples from the memory;
generate a sample based on the clock frequency estimate and the standard deviation of clock frequency estimate error; and
generate a test statistic based on the sample and the plurality of historical samples, wherein the test statistic is representative of the observed behavior associated with the one or more GNSS signals.

16. The apparatus of claim 15, wherein the plurality of historical samples were previously generated over a predefined time window, and wherein the predefined time window represents a sliding time period in which the plurality of historical samples are stored in the memory.

17. A method of spoofing detection performed by a device, the method comprising:
installing an application on the device, wherein the application comprises at least one of a military application or a consumer application, and wherein the device is configured for at least one of military usage or consumer usage;
a receiving component configured to receive one or more global navigation satellite system (GNSS) signals, wherein the receiving component includes a Kalman filter, wherein the application is configured to utilize the one or more GNSS signals from the receiving component;
receiving the one or more GNSS signals, wherein the receiving component includes a Kalman filter, and wherein the receiving component is associated with a type of application installed on the device;
deriving, from the one or more GNSS signals, one or more GNSS measurements;
deriving clock information and location information from the one or more GNSS measurements;
calculating an observed behavior associated with the one or more GNSS signals based on the clock information and the location information; and
identifying the one or more GNSS signals as being spoofed based on a comparison between the observed behavior and an expected behavior of the one or more GNSS measurements.

18. The method of claim 17, wherein the device configured for military usage comprises one of a receiver mounted onto a vehicle, a receiver mounted onto a ship, a receiver mounted onto an aircraft, a handheld device, or a receiver mounted onto a guided munition.

19. The method of claim 17, wherein the device configured for consumer usage comprises one of a civilian aircraft, an autonomous vehicle, and a personal navigation device.

20. A non-transitory computer readable medium having instructions stored thereon that, when executed by at least one processor of a global navigation satellite system (GNSS) receiver, cause the GNSS receiver to perform operations comprising:
installing an application on the GNSS receiver, wherein the application comprises at least one of a military application or a consumer application, and wherein the GNSS receiver is configured for at least one of military usage or consumer usage;
receiving one or more GNSS signals, and wherein the GNSS receiver includes a Kalman filter, wherein the application is configured to utilize the one or more GNSS signals from a receiving component;
deriving, from the one or more GNSS signals, one or more GNSS measurements;
deriving clock information and location information from the one or more GNSS measurements;
calculating an observed behavior associated with the one or more GNSS signals based on the clock information and the location information; and
identifying the one or more GNSS signals as being spoofed based on a comparison between the observed behavior and an expected behavior of the one or more GNSS measurements.

* * * * *